UNITED STATES PATENT OFFICE 2,661,275

HERBICIDAL COMPOSITION

David T. Mowry and Arthur H. Schlesinger, Dayton, Ohio, assignors to Monsanto Chemical Company, St. Louis, Mo., a corporation of Delaware No Drawing. Application January 25, 1951, Serial No. 207,853

2 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material.

Now we have found that highly stable, non-corrosive herbicidal compositions are obtained by employing as the active ingredient an alkyl furfurylidenecyanoacetate having the general formula

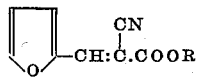

in which R is an alkyl radical of from 1 to 4 carbon atoms. As examples of compounds having the above general formula may be mentioned methyl furfurylidenecyanoacetate, isopropyl furfurylidenecyanoacetate, n-butyl furfurylidenecyanoacetate, etc. The alkyl furfurylidenecyanoacetates are readily obtainable in known manner by reaction of furfural with the appropriate alkyl cyanoacetate in the presence of an alkaline condensing agent.

The present alkyl furfurylidenecyanoacetates are effective herbicides over wide ranges of concentrations. Their effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentration of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited by the following example:

Example

Herbicidal activity of several alkyl furfurylidenecyanoacetates was determined by germination of cucumber seeds for 4 days at a temperature of 76° F. in the presence of aqueous suspensions of each of the indicated chemicals at concentration of 100 p. p. m. Seventy-five seeds were used for each test. The results are expressed as per cent length of the primary roots in the presence of the chemical compared with the length of the primary roots of controls which had been germinated in water. The activity of isopropyl carbanilate, a standard herbicide, as determined by the same test is included for comparison.

| Compound tested | Percent growth at 100 parts per million |
|---|---|
| Methyl furfurylidenecyanoacetate | 12 |
| Ethyl furfurylidencyanoacetate | 12 |
| Isopropyl carbanilate | 14 |

Similarly good results may be obtained with other alkyl furfurylidenecyanoacetates, e. g., n-propyl or n-butyl furfurylidenecyanoacetate.

The herbicidal efficiency of the present esters is surprising because, as shown in the table given below, related compounds do not generally possess great herbicidal efficiency. When tested as described above, aqueous suspensions of a random group of such compounds were found to have the following effects:

| Compound tested | Percent growth at 100 parts per million |
|---|---|
| Furfurylidenecyanoacetamide | 85 |
| Furfurylideneacetone | 76 |
| Diethyl furfurylidenemalonate | 83 |
| Ethyl α, 4-dicyanocinnamate | 55 |
| Ethyl α-cyano-p-chlorocinnamate | 75 |

Herbicidal compositions containing the present ester compounds may be oil solution or an oil emulsion of the ester compound. The oil solutions may be obtained simply by dissolving the ester compound in oil in effective proportions In most instances, however, it is more expedient to prepare oil concentrates of the ester concentrate, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

The present esters are preferably applied by spraying an aqueous suspension of the same, this method affording an easy and inexpensive way of destroying plant growth. However, they are likewise effective when applied in agricultural dusts; or they may be used with water-insoluble insecticides, fungicides, etc. in customarily employed organic solutions.

The aqueous suspensions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

There may be employed 0.1 part to 20 parts of the alkyl furfurylidenecyanoacetate per hundred parts by weight of the carrier, and in this manner an acre of land may be freed of plants by application of only a few pounds of the present herbicides.

What we claim is:

1. The method of destroying undesired plants which comprises applying to said plants a toxic quantity of a herbicidal composition comprising methyl furfurylidenecyanoacetate as the active ingredient.

2. The method of destroying undesired plants which comprises applying to said plants a toxic quantity of an aqueous suspension of methyl furfurylidenecyanoacetate.

DAVID T. MOWRY.
ARTHUR H. SCHLESINGER.

References Cited in the file of this patent

UNITED STATES PATENTS

| Number | Name | Date |
|---|---|---|
| 2,435,780 | Heal | Feb. 10, 1948 |

OTHER REFERENCES

Beilstein, Handbuch der Organischen Chemie, 4th Edition, vol. XVIII, page 338 (1934).